(12) United States Patent
Petander

(10) Patent No.: US 10,827,221 B2
(45) Date of Patent: Nov. 3, 2020

(54) SELECTIVELY PLAYING VIDEOS

(71) Applicant: INCOMING PTY LTD, Sydney, New South Wales (AU)

(72) Inventor: Lars Henrik Petander, Sydney (AU)

(73) Assignee: SOURSE PTY LTD, Sydney, NSW (AU)

( * ) Notice: Subject to any disclaimer, the term of this patent is extended or adjusted under 35 U.S.C. 154(b) by 0 days.

(21) Appl. No.: 16/313,001

(22) PCT Filed: Jun. 22, 2017

(86) PCT No.: PCT/AU2017/050637
§ 371 (c)(1),
(2) Date: Dec. 21, 2018

(87) PCT Pub. No.: WO2017/219089
PCT Pub. Date: Dec. 28, 2017

(65) Prior Publication Data
US 2019/0222895 A1    Jul. 18, 2019

Related U.S. Application Data

(60) Provisional application No. 62/354,118, filed on Jun. 24, 2016.

(51) Int. Cl.
*H04H 60/33*    (2008.01)
*H04N 21/458*    (2011.01)
(Continued)

(52) U.S. Cl.
CPC ........... *H04N 21/458* (2013.01); *G06F 16/74* (2019.01); *G06Q 30/0207* (2013.01);
(Continued)

(58) Field of Classification Search
CPC .............. H04N 21/458; H04N 21/466; H04N 21/44218; H04N 21/4666; H04N 21/4784;
(Continued)

(56) References Cited

U.S. PATENT DOCUMENTS 6,543,051 B1 *  4/2003  Manson ............... G08B 27/008
                                                     348/461
6,684,240 B1 *  1/2004  Goddard ................ H04N 7/163
                                                     348/E7.061

(Continued)

FOREIGN PATENT DOCUMENTS

WO    WO 2016/090421 A1    6/2016

*Primary Examiner* — Michael B. Pierorazio
(74) *Attorney, Agent, or Firm* — Lewis Roca Rothgerber Christie LLP

(57) ABSTRACT

This disclosure relates to selectively playing a video on a mobile communication device. The device monitors events and upon detecting a trigger event, determines whether to delay the playing of a first video or to attempt to play the first video. Upon determining to delay, the device stores a delay record. The device repeats the above steps to generate multiple delay records. Upon determining to attempt to play the first video, the device displays a user control to allow the user to reject the first video and stores an attempt record. Upon detecting user interaction with the user control element, the device calculates a relationship between the delay records, the attempt record, and the user interaction with the user control element. This allows the device to determine whether to delay the playing of a second video or to play the second video. Upon determining to play the second video, the device plays the second video.

19 Claims, 7 Drawing Sheets

(51) Int. Cl.
  *H04N 21/25* (2011.01)
  *H04N 21/414* (2011.01)
  *H04N 21/466* (2011.01)
  *G06Q 30/02* (2012.01)
  *G06F 16/74* (2019.01)
  *H04N 21/442* (2011.01)
  *H04N 21/4784* (2011.01)
  *H04N 21/81* (2011.01)

(52) U.S. Cl.
  CPC ....... *G06Q 30/0272* (2013.01); *H04N 21/251* (2013.01); *H04N 21/41407* (2013.01); *H04N 21/44218* (2013.01); *H04N 21/466* (2013.01); *H04N 21/4666* (2013.01); *H04N 21/4784* (2013.01); *H04N 21/812* (2013.01)

(58) Field of Classification Search
  CPC ............... H04N 21/812; H04N 21/251; H04N 21/41407
  USPC .......................................................... 725/10
  See application file for complete search history.

(56) References Cited

U.S. PATENT DOCUMENTS

| | | | | |
|---|---|---|---|---|
| 7,602,277 | B1* | 10/2009 | Daly | G08B 27/005 340/438 |
| 7,643,564 | B2* | 1/2010 | Sheynman | H04L 63/10 375/259 |
| 7,681,215 | B2* | 3/2010 | Kim | H04H 20/59 340/286.02 |
| 7,870,279 | B2* | 1/2011 | Chuang | H04L 29/06 709/203 |
| 8,745,655 | B2* | 6/2014 | Reddy | H04N 21/25841 725/31 |
| 9,106,976 | B2* | 8/2015 | Emerson | H04N 21/4334 |
| 2001/0021994 | A1* | 9/2001 | Nash | G06Q 30/02 725/42 |
| 2002/0083468 | A1* | 6/2002 | Dudkiewicz | H04N 21/4755 725/133 |
| 2002/0124252 | A1* | 9/2002 | Schaefer | H04N 7/17318 725/33 |
| 2002/0129368 | A1* | 9/2002 | Schlack | G06Q 30/02 725/46 |
| 2002/0188944 | A1* | 12/2002 | Noble | H04N 5/44543 725/39 |
| 2002/0188949 | A1* | 12/2002 | Wang | H04N 5/44543 725/46 |
| 2003/0018977 | A1* | 1/2003 | McKenna | H04N 5/44543 725/115 |
| 2003/0066069 | A1* | 4/2003 | Mankovich | H04N 7/163 725/9 |
| 2003/0216133 | A1* | 11/2003 | Poltorak | G08B 27/006 455/404.1 |
| 2005/0055685 | A1* | 3/2005 | Maynard | G06F 8/65 717/170 |
| 2005/0086685 | A1* | 4/2005 | Rahman | H04L 29/06 725/33 |
| 2006/0234672 | A1* | 10/2006 | Adler | G08B 27/003 455/404.1 |
| 2007/0047520 | A1* | 3/2007 | Byers | H04M 3/42357 370/352 |
| 2007/0121651 | A1* | 5/2007 | Casey | H04N 21/440218 370/401 |
| 2007/0150273 | A1* | 6/2007 | Yamamoto | G10L 15/22 704/231 |
| 2007/0280446 | A1* | 12/2007 | Hsieh | H04L 12/66 379/93.23 |
| 2008/0134043 | A1* | 6/2008 | Georgis | H04N 7/10 715/733 |
| 2008/0307454 | A1 | 12/2008 | Ahanger et al. | |
| 2009/0150925 | A1* | 6/2009 | Henderson | H04N 7/163 725/34 |
| 2009/0158382 | A1* | 6/2009 | Shaffer | H04H 20/57 725/131 |
| 2009/0217324 | A1* | 8/2009 | Massimi | H04H 20/106 725/46 |
| 2009/0239497 | A1* | 9/2009 | Sennett | H04W 4/90 455/404.1 |
| 2009/0247110 | A1* | 10/2009 | Sennett | H04W 4/90 455/404.1 |
| 2009/0247114 | A1* | 10/2009 | Sennett | H04W 4/90 455/404.1 |
| 2009/0247116 | A1* | 10/2009 | Sennett | H04W 4/90 455/404.2 |
| 2009/0300695 | A1* | 12/2009 | White | H04N 5/76 725/109 |
| 2010/0058395 | A1* | 3/2010 | Goergen | H04N 21/6125 725/58 |
| 2010/0060789 | A1* | 3/2010 | Aoki | G09G 5/14 348/563 |
| 2010/0186029 | A1* | 7/2010 | Kim | G08B 27/005 725/33 |
| 2011/0088058 | A1* | 4/2011 | Velazquez | H04H 20/59 725/33 |
| 2011/0126251 | A1* | 5/2011 | LaFreniere | H04N 7/17327 725/110 |
| 2011/0126257 | A1* | 5/2011 | Goergen | H04N 7/17318 725/132 |
| 2011/0131604 | A1* | 6/2011 | Van Hoff | G06F 3/04817 725/38 |
| 2012/0102522 | A1* | 4/2012 | Long | H04W 76/50 725/33 |
| 2013/0274936 | A1* | 10/2013 | Donahue | G06Q 50/06 700/291 |
| 2013/0281047 | A1* | 10/2013 | Daly | H04W 4/90 455/404.1 |
| 2014/0148116 | A1* | 5/2014 | Alman | H04L 67/2828 455/404.1 |
| 2014/0244997 | A1* | 8/2014 | Goel | H04W 12/08 713/155 |
| 2014/0316881 | A1 | 10/2014 | Movellan et al. | |
| 2016/0295300 | A1* | 10/2016 | Alman | H04N 21/814 |

* cited by examiner

SELECTIVELY PLAYING VIDEOS

CROSS-REFERENCE TO RELATED APPLICATIONS

The present application is a U.S. National Phase Patent Application and claims priority to and the benefit of International Application Number PCT/AU2017/050637, filed on 22 Jun. 2017, which claims priority from and the benefit of U.S. Provisional Patent Application No. 62/354,118 filed on 24 Jun. 2016, the entire contents of all of which are incorporated herein by reference.

TECHNICAL FIELD

This disclosure relates to systems and methods for selectively playing videos.

BACKGROUND

Current mobile communication devices, including smart phones and tablet computers, have the capability to store a large amount of high quality videos. The user can readily select any of these videos to be played by the mobile communication device. While this has led to user satisfaction over time, there is still the problem that the user needs to decide when to play the video. Therefore, there is a need for improved mobile communication devices that can automatically play a video from device storage without the user manually requesting the video. However, at certain times the user would be dissatisfied if a video is played automatically without the user's request and it is currently difficult to avoid this dissatisfaction.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

This disclosure describes a mobile communication device that decides whether to play a video automatically and without user input. In particular, the disclosed mobile communication device learns over time whether decisions in the past were good or bad. In particular, the mobile communication device makes multiple decisions to delay the playing of the video until it finally attempts to play the video. The mobile communication device then assesses retrospectively whether those delaying decisions where beneficial and then adjusts the decision making accordingly. As a result, the mobile communication device plays videos at the most appropriate times automatically.

A method for selectively playing a video on a mobile communication device comprises:

monitoring events on the mobile communication device;

upon detecting a trigger event in the events, determining whether to delay the playing of a first video or to attempt to play the first video;

upon determining to delay the playing of the first video, storing on a data store a delay record indicative of a context of the mobile communication device in which the playing of the first video is delayed;

repeating the steps of monitoring events and upon determining to delay the playing of the first video, storing a delay record indicative of a context of the mobile communication device in which the playing of the first video is delayed, to generate multiple delay records representing multiple points in time when the playing of the first video is delayed and each of the multiple delay records indicates a respective context of the mobile communication device;

upon determining to attempt to play the first video, displaying a user control on the mobile communication device to allow the user to reject the first video;

storing an attempt record indicative of a context of the mobile communication device in which the playing of the first video is attempted;

upon detecting user interaction with the user control element indicative of the user rejecting the first video, calculating a first relationship between the context data of the multiple delay records, the attempt record, and the user interaction with the user control element;

determining whether to delay the playing of a second video or to play the second video based on the first relationship between the context data of the multiple delay records, the attempt record and the user interaction with the user control element and based on a current context of the mobile communication device; and upon determining to play the second video, playing the second video.

It is an advantage that the timing of showing videos is improved by calculating a relationship from the context data of the multiple delay records in addition to the attempt record. In other words, not only does the system use the context data from when the user makes a decision on whether to watch the video, but also the context data from when the method decides not to give the option to the user but delay until a more suitable point in time. As a result, the timing of the video is more accurate in reflecting user behaviour and preferences.

Monitoring events may comprise monitoring events generated by a user interacting with the mobile communication device.

The video may comprise an advertisement video.

The context may be independent from the video and includes one or more of time of day, user activity, active apps and sensor data.

Calculating a relationship may comprise calculating one or more of a positive weight upon the video being played, a negative weight upon the video being rejected and a negative weight upon the video being delayed.

Calculating the relationship may comprise calculating a value function that maps feature values to expected benefits of delaying and/or attempting to play the video.

The value function may be based on a time elapsed since last played video.

Calculating the relationship may comprise calculating a first value function and a second value functions, the first value function is in relation to attempting to play the video and the second value function is in relation to delaying the video.

The value function may be linear.

The value function may be based on parameters reflecting the relationship.

Calculating the relationship may comprise reinforcement learning and/or linear regression.

Calculating the relationship and determining whether to delay the playing of the second video may be based on an ensemble model of decision trees or on a neural network or both.

Determining whether to delay the playing of the second video may be based on a predetermined number of times a video is to be played.

The method may further comprise allocating an incentive to the user upon playing the video.

The method may further comprise recording a video of the user and determining allocating the incentive based on a facial expression detected in the video.

Calculating the relationship may comprise sending training data to a server and retrieving relationship parameters from the server.

The method may further comprise selecting the second video from multiple candidate videos.

Selecting the second video may be based on meta-data of the second video and a second relationship between meta-data of the first video and the user interaction with the user control element.

A mobile communication device for selectively playing a video on a mobile communication device comprises:

a user interface to allow user interaction to generate events;

a network connector to receive videos over a wireless data network;

a non-volatile memory to store videos and to store program code; and a processor configured by the program code to:

monitor the events on the mobile communication device;

upon detecting a trigger event in the events, determine whether to delay the playing of a first video or to attempt to play the first video;

upon determining to delay the playing of the first video, store on a data store a delay record indicative of a context of the mobile communication device in which the playing of the first video is delayed;

repeat the steps of monitoring events and upon determining to delay the playing of the first video, storing a delay record indicative of a context of the mobile communication device in which the playing of the first video is delayed, to generate multiple delay records representing multiple points in time when the playing of the first video is delayed and each of the multiple delay records indicates a respective context of the mobile communication device;

upon determining to attempt to play the first video, display a user control on the mobile communication device to allow the user to reject the first video;

store an attempt record indicative of a context of the mobile communication device in which the playing of the first video is attempted;

upon detecting user interaction with the user control element indicative of the user rejecting the first video, calculate a first relationship between the context data of the multiple delay records, the attempt record, and the user interaction with the user control element;

determine whether to delay the playing of a second video or to play the second video based on the first relationship between the context data of the multiple delay records, the attempt record and the user interaction with the user control element and based on a current context of the mobile communication device; and upon determining to play the second video, play the second video on the user interface.

Optional features described of any aspect of method, computer readable medium or computer system, where appropriate, similarly apply to the other aspects also described here.

BRIEF DESCRIPTION OF DRAWINGS

An example will now be described with reference to the following drawings.

DESCRIPTION OF EMBODIMENTS

Figure 1:
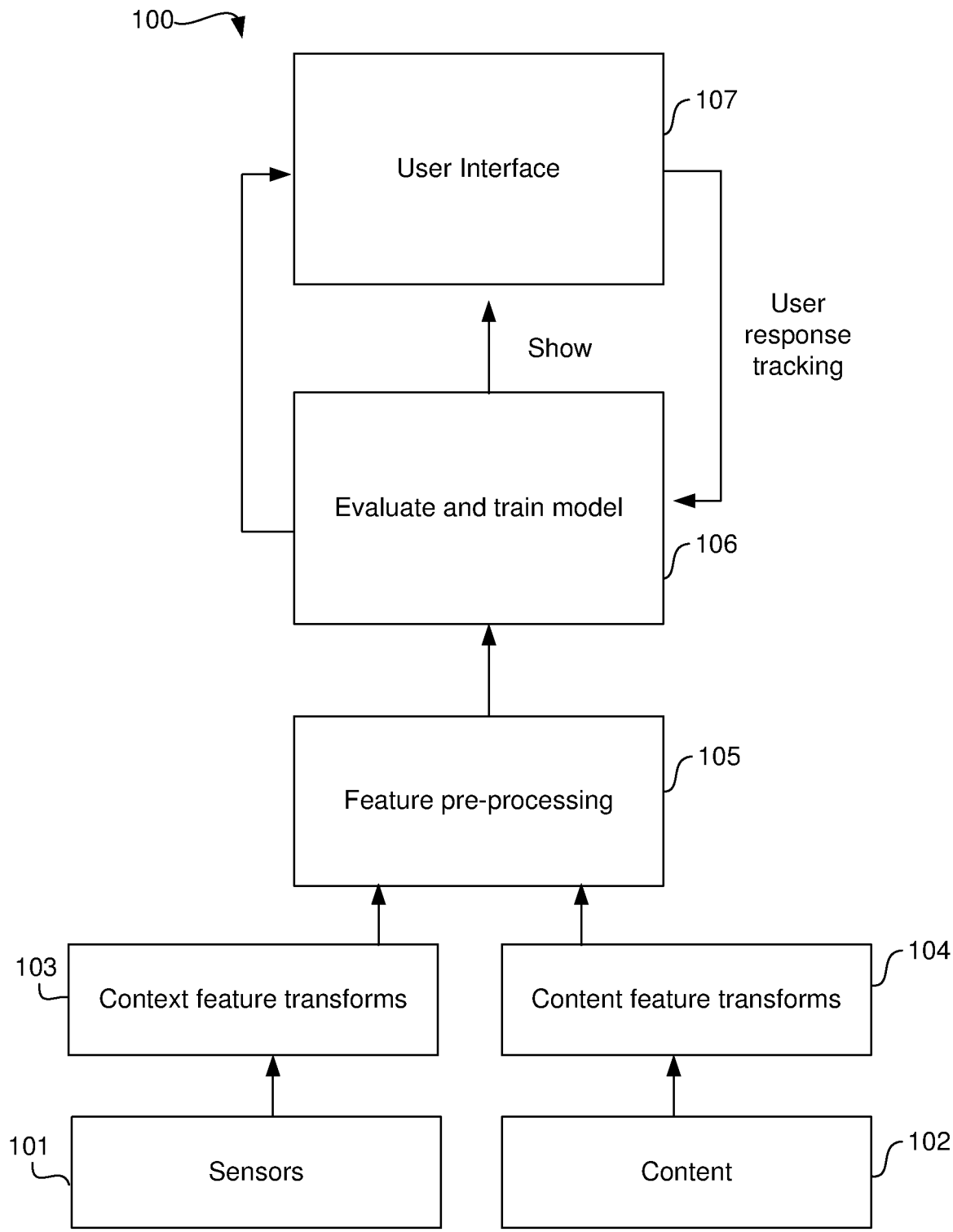
FIG. 1 depicts the high level architecture of the system.

This disclosure describes a mobile communication device that decides whether to play a video automatically and without user input. A video may be a video stream or a video file stored on the mobile communication device. Playing a video may comprise automatically opening a player application that plays the video or playing the video from within an application. The videos can be shown as a part of applications between application screens, on top of applications, between applications, on unlocking the screen or on the home screen. The system can show the videos in response to user interface events, such as closing an application or turning the screen on, or in response to events from sensors, such as time or location change. In other words, the mobile communication device monitors the events generated by the user interacting with the device and detects a trigger event, such as turning the screen on or a time or location change. These events create opportunities to show a video, in response to which the system can decide to show a video or wait for a better opportunity, that is, delay the playing of the video.

The system operator may receive a monetary reward, if the user engages with the shown video in a certain way. For example, for video advertisements, the user may need to watch 80% of the duration of the video for the service operator to get paid by the advertiser or a proxy acting on the behalf of the advertiser, such as an ad network.

While this disclosure is in substance related to the technical aspects of automatically playing videos, the disclosed technical subject matter may be used in a commercial context where the user receives incentives from watching the videos, for example free access to services, in-service credits or rewards, or more generally reduced costs of using those services. It is noted, however, that the disclosure has utility also without this commercial application because the automatic display of videos as such can be attractive to many users. In the commercial applications, the incentives help align the goals of the user with the goals of the system operator, when the video content is not sufficiently interesting for the user to watch it without external rewards. For example, offer wall type of ad videos could provide a direct incentive for performing an action, such as a service credit. On the other hand promotional content directly related to the user's interest may be interesting enough for the user to watch it without additional incentives. Provided that the system lets the user easily skip or leave a video that is badly timed or chosen, it can be assumed that the user is not annoyed by the video, when she does not skip it, but instead engages with it. If the video is hard to skip, this assumption may not hold. It is noted that skipping a video is only one way of rejecting the video. Other ways include closing a video player window, stopping the video player application, using a back button on the phone to return to the original application before the video started playing or other ways.

On the other hand, if the user dislikes being shown the video, she will not perform the action required to generate the reward for the publisher and she will be annoyed by the disruption. For example, being shown a video when trying to answer a phone call would irritate most users. Repeated badly chosen or timed videos may lead the user to leave the service. This is especially true for videos that are hard to skip. Thus, the publisher receives a negative economic reward for a video that is shown, but that the user does not want to watch.

FIG. 1 illustrates an example architecture of a system 100 for selectively playing videos. System 100 comprises sensors 101 and content 102, such as videos, stored on a content store (not shown). A context feature transformation module 103 receives data from the sensors 101 to create features that are indicative of the current context. A content feature transformation module 104 analyses meta-data from the content to create features that are indicative of the content. Both the context feature transformation module 103 and the content feature transformation module 104 provide the features to a feature pre-processor 105 that pre-processes the combined feature set to optimise it for machine learning. The pre-processor 105 provides the optimised feature set to the model evaluation and training module 106, which performs the two functions of training the model based on historical feature values and evaluating the model based on current feature values. There is also a user interface that interacts with the user in order to collect an outcome for the output label for each set of feature values to feed into the evaluation and training module 106. The modules in FIG. 1 can be implemented as software components, including classes, libraries, binaries, functions and the like, as well as separate hardware processors or virtual machines.

The system 100, as shown in FIG. 1, uses positive and negative rewards to teach itself when to show videos and which videos to show with the assumption that the user is willing to watch the right videos, if they are shown in suitable situations. Positive and negative in this disclosure is not meant to be limited to positive and negative numbers, respectively. Instead, positive and negative is to be understood in the sense that the rewards (i.e. feedback) influences the decision in a positive or negative way. For example, a positive reward associated with a particular decision outcome means that this decision outcome is marked as preferred. Vice versa, a negative reward marks the decision outcome as less desirable. From an algorithmic point of view, positive rewards can be encoded by negative numbers, such as cost, or as positive numbers, such as value. Equally, negative rewards can be encoded by positive numbers, such as cost, or as negative numbers, such as value. When the user is incentivized and the user's goals are aligned with the operator's goals, this can be expected to be the case. When it has an opportunity to show a video, it can choose between two actions, wait or show video. It is noted that the terms 'wait' and 'delay' are used interchangeably herein as well as the terms 'show' and 'play' are used interchangeably. These actions result in the system receiving rewards depending on the outcomes of the action: a positive reward for user watching the video and a negative reward for the user skipping the video. The system learns from the rewards to choose the action that maximizes the current and future rewards. It is noted here that rewards refer to technical parameters, such as weight values or factors used for calculation as opposed to commercial rewards of a reward point scheme for example.

In a potential commercial application, the rewards used in the learning may be derived from monetary rewards to the publisher from the user viewing the videos. If the user watches the video and installs an application or purchases a product, a higher reward can be used in the learning. For example, a reward of 0.5 may be used for a user completing the video and a reward of 1.0 for the user installing the advertised application. The positive rewards can also be lower for videos that are hard to skip, since the user may not skip them in spite of not wanting to watch the video and this behavior could misdirect the learning.

The negative rewards from the user skipping the videos can be modeled for example based on the analytics of churn and new user acquisition costs. Less intrusive ad types and videos that are easier to skip can use a lower negative reward, while videos which are intrusive and hard to skip would have a large negative reward. This is due to the harder to skip videos annoying the user more, if shown at an inappropriate time or if the content is not of interest to the user. For example, a video ad that was shown after unlocking the screen preventing the user from using the phone and that can only be skipped after watching 10 seconds of it would have a lower negative reward for skipping, −1, compared with a video that could be skipped right away having a reward of −0.5 for skipping.

The rewards for the current and future actions are estimated by a value function, which predicts the rewards based on one or more features that describe the state of the system environment. The value function can be implemented using diverse machine learning techniques, including linear regression or logistic regression, neural networks, decision trees, or ensembles methods. One example realization is shown as an example.

The use of value function maximizes the benefit to the user while minimizing the negative user experiences. In the commercial application, maximising the benefit means maximising revenue. The balance between the two is controlled by the ratio of positive the reward from watching the videos versus the negative reward from skipping the video. The larger the positive reward is compared to the negative reward, the more the system will learn to show videos. System rules can be used to implement more specialized use cases, for example minimizing the negative user experiences of getting the user to watch a fixed number of videos.

The features used in the value function estimate how receptive the user is to viewing a specific video or videos in general in the current state. The features can be related to the current and past context data, that is data from software and hardware sensors, or meta-data describing the video content and information about past videos shown. The value function maps feature values to expected benefit received from an action and its follow up actions, for example a set of actions comprising a wait action, another wait action, and a show action.

The meta-data can describe the video topic, style, duration, popularity, recommendation engine rank, how users similar to the current one responded to it, the amount of revenue, or other metrics. Additional meta-data can be derived from the content, for example by analyzing the video file. Videos for content or applications can be matched with downloaded or installed content or applications, or recently used content or applications. For example, a user that played multiple games recently and switched between them frequently, thus indicating being bored of them, could be shown a video about a game that matches his gaming preferences, such as a sequel for one of the most recently played games.

The contextual data can contain data describing the environment of the device, such as sensor data on temperature, location, time, whether the user is moving, stationary, in a vehicle, wearing headphones, etc. It can also contain information about the software state of the device, such as what app the user was last using, how often the user switched apps, how often the user has been turning the screen on, which apps the user has installed, music or other content loaded or accessed on/with the device. In addition to using the context values themselves, transformations and combinations of the data can be used, such as change in user headphone state, or combination of headphone state and user being in vehicle.

The selected features are transformed so that they can be used by the value function method. For example, a linear regression value function would require normalizing the inputs.

In one example, the value function can use only a single feature, for example the time since the last watched ad. The less time from the user watching a video, the less likely they are to want to watch another one. In this case, a separate value function instance estimates the value of each action, for example by multiplying the feature x with a weight b and adds a bias parameter a to the product.

$$V=a+bx$$

The two parameters bias a and weight b are initialized to small non-zero values. The system evaluates the value function for both actions in response to an opportunity to show a video, for example the user unlocking the device. It then chooses the action, whose value function has a higher value based on the current value of x, the time since last watched ad.

Figure 2:
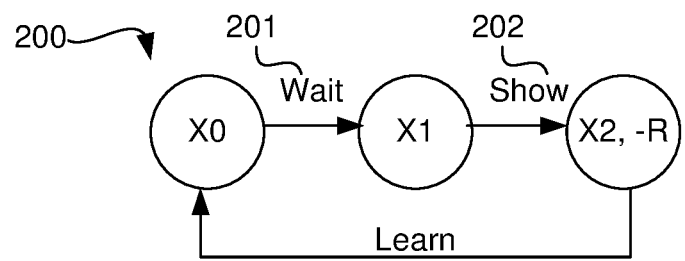
FIG. 2 depicts an example state diagram for showing advertisements.

FIG. 2 illustrates a state transition graph 200. In the example, the system chooses to wait 201 for the next opportunity (i.e. delay). For waiting, the reward could be fixed or be a negative value tied to time, for example a fixed negative reward per hour of waiting or per unit of system usage, so that the user's use of the system without been shown videos would lead to an increasing negative reward. The reward is then used to adapt the value function for the wait action, so that the predicted value is closer to the realized reward. Someone skilled in the practice of machine learning can implement the learning of the parameters a and b in the value function. One possible realization of the learning is shown as an example.

With the next opportunity, the evaluation of the two value functions results in the system attempting to show 202 the video, and it then tracks the response. If the user watches the video, the system applies a positive reward. If the user dismisses or skips the video, the system applies a negative reward. In this example, the user rejects the video and the system receives a negative reward.

The negative reward is then used to adapt the value function, so that the predicted value is closer to the realized reward. This is done both for the initial wait action and the following the show action, so that the negative value from showing the video affects the chain of actions leading to it being shown. Someone skilled in the practice of machine learning can implement the learning of the parameters a and b in the value functions for both actions. Possible realizations of the learning using different learning mechanisms are shown as examples herein.

After adapting the value functions to the new learning, the system will wait for the next opportunity.

Due to learning from sequences of actions, the mobile advertising system learns that it is better to wait even in a situation with a relatively large probability of the user viewing the video, if this situation is typically followed by a situation with an even higher probability. This has the benefit that the system can find and exploit the best opportunities without extra algorithms or heuristics to convert the learning predictions into decisions.

Figure 3:
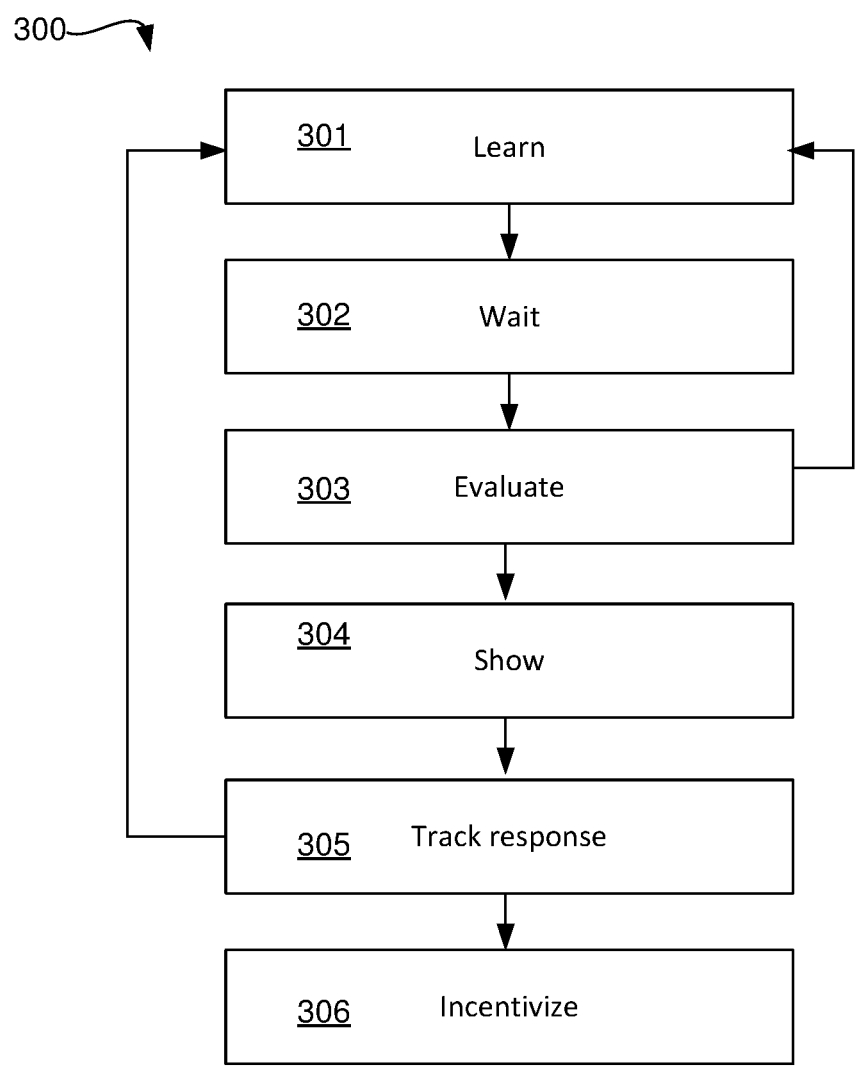
FIG. 3 depicts the flow diagram of the system operation.

FIG. 3 illustrates an example method 300 performed by the mobile communication device. The device starts by learning 301 based on context data and decides to wait 302. After that, the device evaluates 303 the model and returns back to the learning step 301. After typically multiple decisions to wait, the evaluation step 303 determines to attempt to show 304 the video. Consequently, the device tracks 305 the response and returns with the collected learning features to the learning step 301. Finally, the user 306 can be incentivised in a commercial application example.

Figure 4:
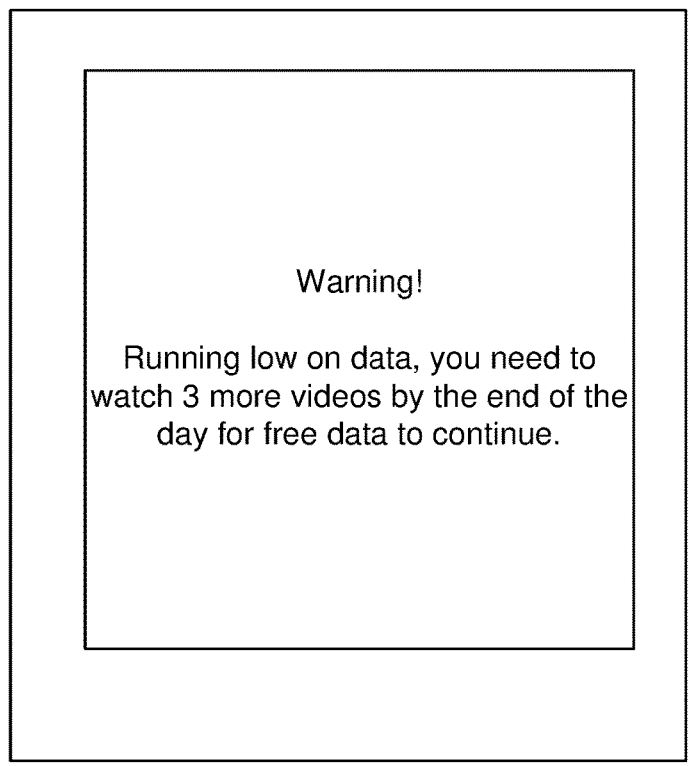
FIG. 4 shows an example of an incentive reminder screen.

The system can also provide the user reminders of the incentives. For example, if the user has rejected too many videos within a time period, the system may show a reminder that a service that the user is subscribing requires the user to watch a certain number of the videos to remain free. An example of a reminder is shown in FIG. 4. Alternatively, a positive reminder can be used before showing a video, for example that the user can enjoy a unit of extra free service, if she watches the video. In addition to reminder screens, the system may display a widget or a screen showing watched videos versus number of required videos to watch to receive an incentive or reward. The positive reminder can be shown before revealing the video and the skip button in FIG. 7. The incentive widget may also offer the user an opportunity to watch a video right now and choose which ad to watch. The user may be provided with an opportunity to choose types of videos to watch.

Initially, the system has not learned anything about the users preferences and cannot exploit the learning. The system then needs to explore, which feature values correspond to good opportunities for showing videos, and which ones correspond to non-ideal opportunities the system to wait. The exploration and exploitation of learning are balanced to maximize the value gained over time. This balancing can be implemented by someone skilled in the art, and examples of ways to do this are given later in the possible embodiments section.

To speed up the learning and reduce the need for exploration, initial learning parameters, such as linear regression weights and feature normalization parameters, can be pre-loaded onto the device. The learning parameters can be derived offline from parameters that worked for other similar users, for example by averaging them or training a single model with all the training data from all the users.

Figure 5:
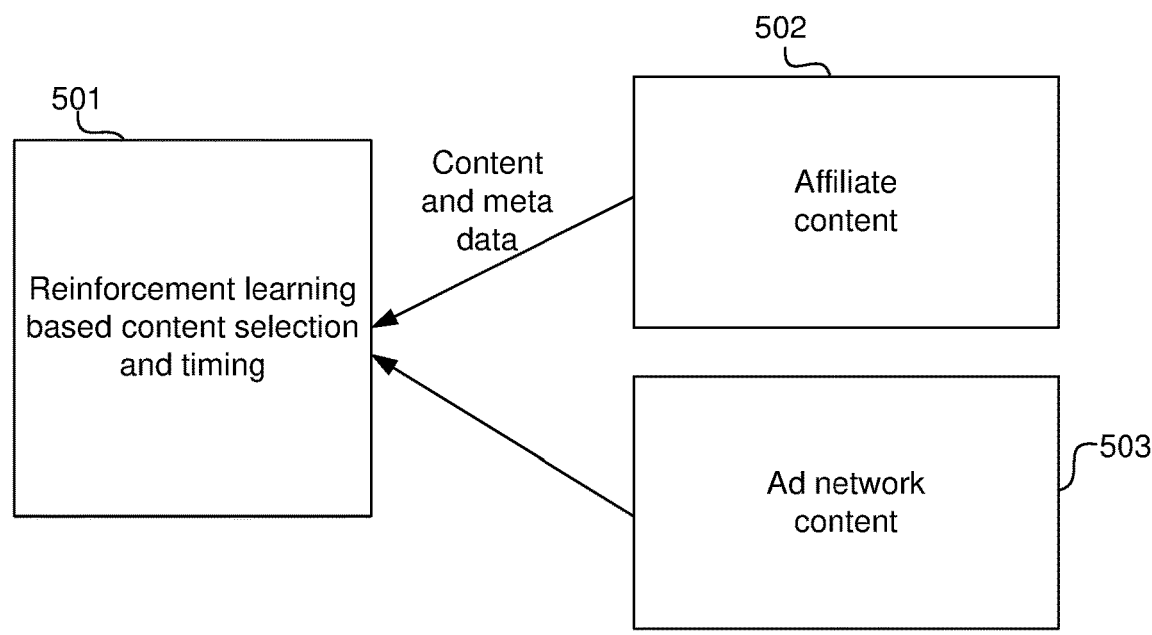
FIG. 5 illustrates the system with content selection and timing using multiple content sources.

FIG. 5 illustrates how the system can choose both the content item and the timing, in which case the system can learn 501 which content and time or context are best for the user from the publisher's point of view. The content can be sourced from a single source, for example an affiliate network 502 or a video network 503 or from multiple sources.

If there are multiple content items available, the value function is estimated for each of them. Then the system chooses the action with the highest predicted value to exploit the past learning. Alternatively, the system can choose to explore new options instead of exploiting the learning to broaden its knowledge of the value of so far unexplored actions from the current state.

Figure 6:
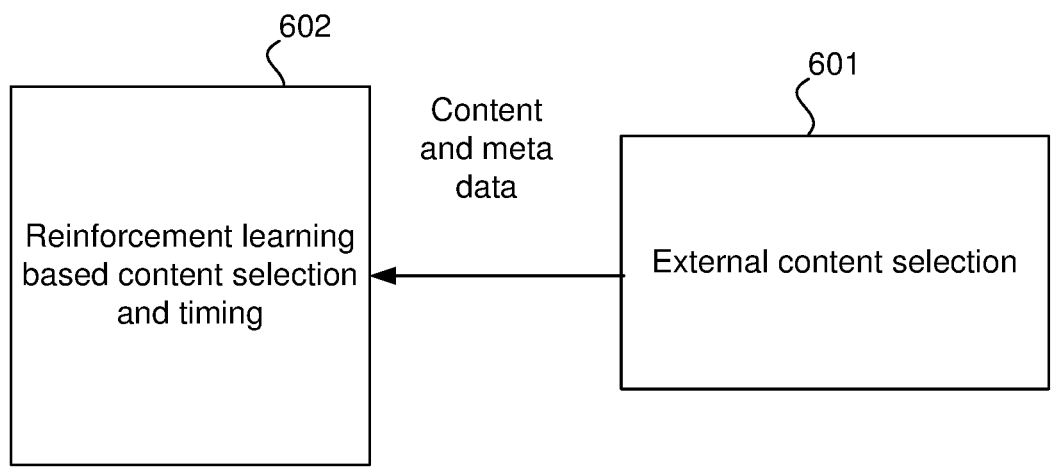
FIG. 6. shows how external content selection is working together with timing.

FIG. 6 illustrates an alternative, where the content selection 601 can be performed outside the system 602, as shown in FIG. 6. With two separate systems working together, there will be interactions between the content selection and timing. For example, if the content selection system 601 explores new content that the user has not been exposed to, this may slow down the learning 602. To manage these interactions, the selection criteria, such as score or rank and confidence, can be used as inputs for the timing. Further, the criteria can also be used to inform the system of whether to try to show the content multiple times, if the user skips the content the first time.

Figure 7:
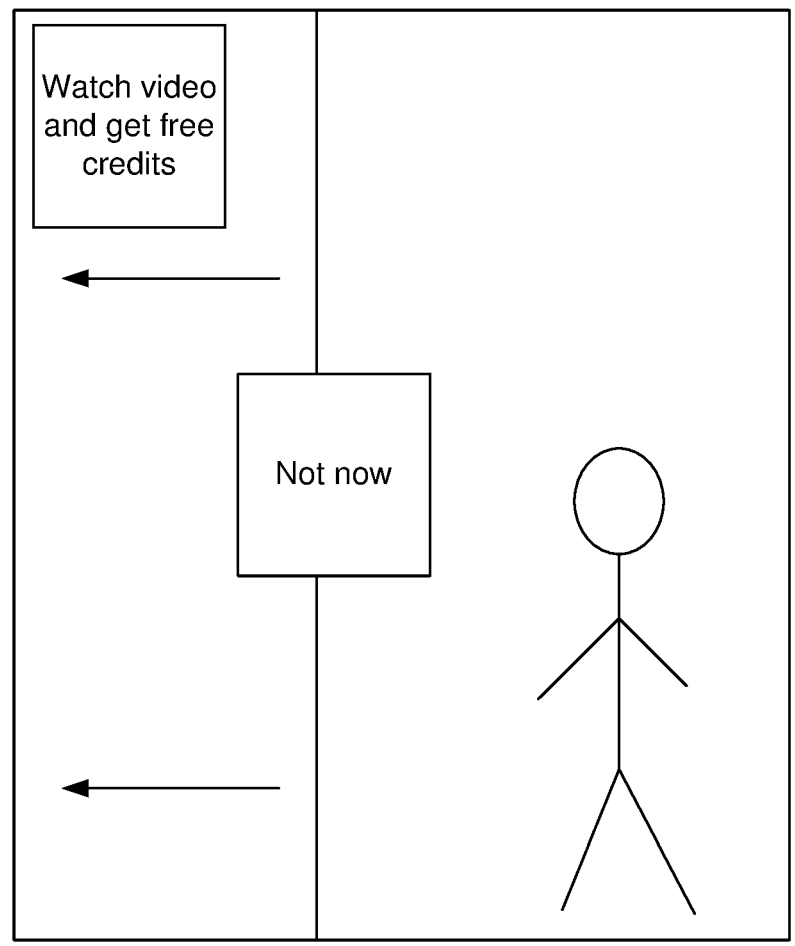
FIG. 7. shows user interface for providing feedback on ad timing.
Figure 8:
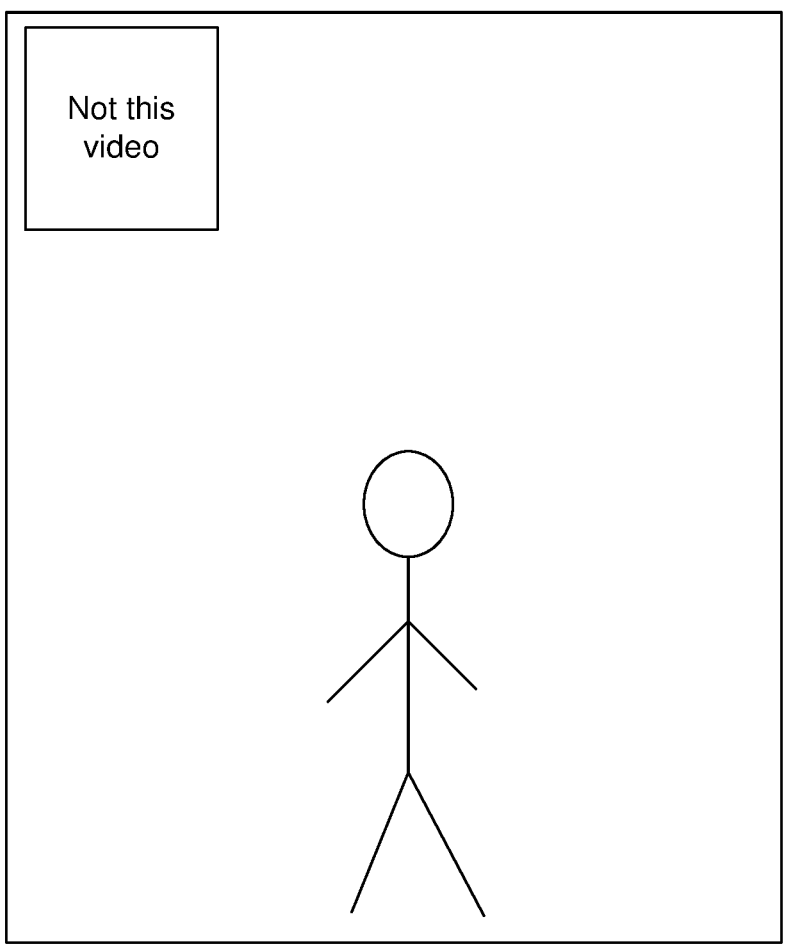
FIG. 8. shows user interface for providing feedback on ad selection.

The user interface can also be designed to provide separate feedback mechanisms for the content selection and the timing. In FIG. 7., the system transitions from normal view, for example home screen view, to the video view with an animation where the video slides slowly in from the right. Before the video slides in an incentive screen is shown before it to remind the user why she should watch the video. While the video is sliding in, there is a button "Not now" allowing the user to skip the video, which explicitly signals that this was a bad moment for a video. After the video has taken over the screen, there will be a different skip button as shown in FIG. 8. The "Not this ad" button explicitly signals that the user does not want to see this advertisement, but would be willing to watch another one. If content selection and timing are handled by separate systems, then having explicit feedback signals for both will speed the learning and allow independent exploration of new content and timing options.

The learned value functions can be evaluated on the device or on a server or a set of servers. Adapting the parameters of the value functions to the rewards received, that is performing the learning, can also be done either on the device or in the cloud. Choosing between these options presents a trade-off. Applying the model on the device has the upside of reducing the latency of showing content, which may improve the user experience. If learning the parameters for the value function is computationally relatively light, as in the case of some iterative solutions such as the one shown in the first embodiment of the invention, the learning can be done on the device as well. Having both the evaluation and learning of the value function on the device has two upsides: 1) it protects the privacy of the user data, which does not need to leave the device and 2) the computations are offloaded to the user devices, which may lower the costs of operating the service.

However, if more complex value function methods, such as ensembles of decision trees or multilayer neural networks, are used due to their superior predictive powers, then updating the model parameters based on learning may be computationally infeasible on the device. In this case, the learning can be offloaded onto a server or set of servers, while optionally keeping the model application on the device.

As a third option, having both the value function learning and evaluation on the server additionally allows using inputs that are not available on the device, such as information about the user profile or information about other users or their content behavior.

DESCRIPTION OF POSSIBLE EMBODIMENTS

First Possible Embodiment

In one possible embodiment of the invention, the system is implemented using reinforcement learning with linear function approximation[Baird] using stochastic gradient descent [Zhang]. Reinforcement learning is a class of machine learning techniques, that allow using rewards to train models, providing one realization of the training. Linear function approximation uses a linear regression algorithm that maps feature values to predicted values for each action. Stochastic gradient descent is an iterative training method that is used to learn the best-fit values for the bias and weight parameters of the linear regression equation. It allows updating the parameters one sample at a time.

In this embodiment the user receives free premium music and movie content access in exchange for watching videos. The user is thus incentivized to watch a large number of videos and there are no specific rules limiting the number of videos shown. The video load is controlled fully by the learning, so that videos are shown whenever the expected reward is larger than that of waiting. With too many videos the user will skip more of them and the realized rewards of showing videos will drop compared to waiting and the system will decrease the frequency of the videos to only show them at the best opportunities.

The system learns the effects of its actions by updating the value function model by taking into account the difference between the estimated value of the chosen action and the realized reward of the action, and the reward of the next actions taken.

The system is preloaded with learning parameters for linear function approximation and chooses whether to show a video or not, and learns from the outcome. The videos are chosen by an external content selection system, which also includes the score of the video based on output from a recommendation engine.

The system is configured to use two features, the number of applications opened in last 10 minutes as a feature ($x_{Apps}$) and the recommendation score ($x_{Score}$), for linear function approximation. Upon watching a video advertisement completely, a reward (r) of 0.5 is received and upon skipping a video advertisement a reward of −0.3 is received. If the user also installs the application being advertised or buys the product being advertised, a reward of 1.0 is received. Further, the system uses a learning rate of 0.2 and a reward discount factor of 0.8. The learning rate determines how quickly weights are changed in response to learning and the discount factor determines how much the rewards of the current action affect past actions. The system also uses epsilon greedy learning with an epsilon of 0.05. The epsilon controls the exploration rate, 95% of the time the system chooses the highest valued action and 5% of the time it chooses randomly an action to avoid getting stuck in a local minima.

The system is initialized to have a weight ($w_{AppsS}$) of 0.1 for the number of apps opened in the last ten minutes feature for the function approximating the value of showing a video and a weight ($w_{AppsD}$) of −0.1 for the function approximating the value of waiting and not showing a video. The weight for the score of the content ($w_{ScoreS}$) is initialized to 0.2 for showing the video and to −0.1 for waiting ($w_{ScoreD}$). The initial values are based on averaging weights from existing users with similar expected behavior based on customer segment.

The value of the number of apps opened in the last ten minutes feature is normalized by subtracting its mean in this case 5 and dividing by its maximum value 10. The value of the content score feature is normalized by subtracting its mean 50 and dividing by its maximum value 100. The mean and maximum values are preset based on average values across users.

The expected reward for delaying can be calculated:

$$r_d = w_{AppsD}*(x_{Apps}-5)/10 + w_{ScoreD}*(x_{Score}-50)/100$$

Similarly, the expected reward for showing can be calculated:

$$r_s = w_{AppsS}*(x_{Apps}-5)/10 + w_{ScoreS}*(x_{Score}-50)/100$$

Now let us look at a specific decision scenario. The user of the system has opened 1 app in the last 10 minutes and an opportunity comes to show a video with a recommendation score of 50. The system performs a check by drawing a random number between 0 and 1 and compares that with epsilon. The random number was larger than 0.05 and the system chooses to use the best known action. The system calculates the value function value for the show and wait cases by calculating the sum of the products of the weights and normalized features. For the show action, the value is 0.1*(1−5)/10+0.2*(50−50)/100=−0.04 and for the wait action the value is −0.1*(1−5)/10−0.1*(50−50)/100=0.04. The predicted value from waiting is larger than the predicted value from waiting and the user is not shown the video, instead the system will wait for the next opportunity.

Next, the user of the system has opened 6 apps in the last 10 minutes and a new opportunity comes to show the same video with a recommendation score of 50. Again, the system performs a check by drawing a random number between 0 and 1 and compares that with epsilon. The random number was larger than 0.05 and the system chooses to use the best known action. The system calculates the value function value for show and wait cases. For the show action, the value is 0.1*(6−5)/10+0.2*(50−50)/100=0.01 and for the wait action the value is −0.1*(6−5)/10−0.1*(50−50)/100=−0.01. Now, the predicted value from showing is larger than the predicted value from waiting and the user is shown the video.

The user watches the whole ad video and installs the application being advertised, and the system receives the reward 1.0.

In contrast to supervised learning procedures, reinforcement learning connects the sequence of actions leading to the reward. In this example, by waiting at the first opportunity, the system gets a chance to show the video at a better opportunity. The system learns the benefits of waiting by propagating a discounted reward to the previous wait action. This example uses State-Action-Reward-State-Action (SARSA) algorithm, in which the system learns from the rewards of the taken actions[Singh].

The reward of 1.0 is multiplied by a discount factor, which in this example is set to 0.8 and the weights for the wait action are updated based on the feature values present at the time of the wait decision. The new weights are calculated by subtracting from the old weight the difference between the predicted reward and the discounted realized reward multiplied by the value of the feature and the learning rate. The new weight for the number of apps opened in the last ten minutes feature becomes then −0.1−0.2*(0.04−0.8*1.0)*−0.4=−0.1608. The weight for the content score remains the same, since its value was 0.

The decision to show the video ends the action chain for this ad and therefore also the weights for the show action are updated. The reward of 1.0 is used to update the weights for the show action. The new weight is calculated by subtracting from the old weight the difference between the prediction and the actual reward multiplied by the value of the feature and the learning rate. The new weight for the number of apps opened in the last ten minutes feature becomes then 0.1−0.2*(0.1−1)*0.1=0.118. The weight for the video score feature does not change, since the value of the feature was 0.

Second Possible Embodiment

In a second possible embodiment of the invention, the video timing and ad selection are combined into the learning. There are two types of videos with different revenues per ad, car videos with higher revenue 10 c per view and detergent videos with a revenue of 5 c per view. In this embodiment the user receives free mobile data in exchange for watching three videos per day to completion. The user is thus incentivized to watch three videos and after those has no incentives to watch anymore and any videos shown after those are very unlikely to be watched and will only annoy the user. To deal with this constraint, the system uses a rule that limits the videos per day that are shown to the user, so that after three watched videos, no more will be shown. The learning will ensure that the system shows the videos at the best times.

The system is configured to use the number of videos that the user still needs to watch in the next 12 hours as a feature for linear function approximation. Upon watching a video advertisement completely, a reward of 1 is received for car videos and a reward of 0.5 for detergent videos. These rewards are derived directly from the video revenue by dividing the monetary reward for each ad type by the maximum value of 10 c per view. Upon skipping a video advertisement a reward of −0.3 is received. Further, the system uses a learning rate of 0.2.

The system is initialized to have a weight of 0.1 for the number of videos that the user still needs to watch in the next 12 hours for the function approximating the value of showing a video and a weight of −0.1 for the function approximating the value of waiting and not showing a video. The system also uses two content meta data features, content topic "cars" with weight 0.1 for showing and 0 for waiting and content topic "detergent" with weight 0.05 for showing and 0 for waiting. The difference in the initial weights is due to the difference in the rewards and assumes that users are as likely to watch either ad.

The value of the number of videos that the user still needs to watch in the next 12 hours feature is normalized by subtracting its mean in this case 0.75 and dividing by its maximum value 3. The mean and maximum values are preset based on average values across users. The "cars" and "detergent" features have an average value of 0 and maximum value of 1.

The user of the system needs to watch 2 more videos in the next 12 hours and an opportunity comes to show a video. There are two possible videos, one with the topic "cars", and another one with the topic "detergent". The system calculates the value function value for show and wait cases for both videos.

For the "cars" video and show action, the value is 0.1*(2−0.75)/3+0.1*(1−0)/1=0.52 and for the wait action the value is −0.1*(2−0.75)/3+0=−0.42.

For the "detergent" video and show action, the value is 0.1*(2−0.75)/3+0.05*(1−0)/1=0.47 and for the wait action the value is −0.1*(2−0.75)/3+0=−0.42.

There are two options, 1) show car video and wait with detergent ad and 2) show detergent video and wait with the car ad. The option 1) has a higher combined value and it is chosen.

The user watches the whole car video and the system receives the reward 1. This is used to update the weights for the show action. The new weights are calculated by subtracting from the old weight the difference between the prediction and the actual reward multiplied by the value of the feature and the learning rate.

The new weight for the number of apps opened feature becomes then 0.1−(0.11−1)*0.1*0.2=0.1178. The new weight for the "cars" feature becomes then 0.1−(0.11−1)*1.0*0.2=0.278. The weight for the "detergent" feature does not change.

Third Possible Embodiment

In a third possible embodiment of the invention, the user may be shown a video that interrupts her usage of the phone based on her reaction to an associated short video being played on the lock screen or wallpaper of the phone.

The user is shown a video on the phone lock screen, after she turns the screen on, but before she unlocks the keyguard. The system records how she watches the video before unlocking her keyguard.

Then, when the keyguard is unlocked, the system may show a longer video or a call to action screen associated with the first video before displaying the most recent app or the home screen. The system uses the user's response to the first video, including how long she watched it, and how long her eyes were focused on the video or how long her face was detected, as additional inputs for the function approximation used for deciding whether to show the video. The percentage of the first video watched with eyes focused on it is used as the feature with the values of the feature varying from 0 to 1.

Upon responding to the call to action for the video, a reward of 1 is received and upon skipping the screen a reward of −0.3 is received. A reward of 0 is received for waiting. Further, the system uses a learning rate of 0.2 and a reward discount factor of 0.8. The system also uses epsilon greedy learning with an epsilon of 0.05. The system is initialized with a weight of 0.5 for the video completion feature for show action and a weight of −0.3 for waiting. The feature is normalized by subtracting a mean of 0.5.

The user watches 30% of the video on the lock screen before unlocking the keyguard. The exploration versus exploiting of model check is performed as in previous examples.

The value function approximation for showing the call to action screen is: 0.5*(0.3−0.5)=−0.1. The approximation for waiting is −0.3*(0.3−0.5)=0.06. The system chooses the higher value option and waits.

Fourth Possible Embodiment

In a fourth possible embodiment of the invention, the user is primed for a video that interrupts her usage of the phone by an associated video or image ad being shown on the lock screen or wallpaper of the phone. The embodiment is similar as the third one, except that the system uses the captured video frames or photographs of the user's reaction to the short video as inputs to the value function and the value function is trained on a server using inputs from all the users. Using the frames from the video or photographs has the potential benefit of capturing the user's emotional reaction to the video, which is likely to reveal more information about the user's receptiveness to the service or product that was advertised than less direct metrics.

The user is shown a video or image ad on the phone lock screen, after she turns the screen on, but before she unlocks the keyguard. A video can be shown every time the user turns the screen on, periodically, or using a value function to estimate the best moment to nudge the user with a non-interruptive video. Use of a value function would essentially chain two value functions together, with the first one deciding whether to nudge the user with a non-interruptive ad, and the second one after the nudge to decide whether to interrupt the user with a call to action or a more interruptive video. The use of a first value function is described in embodiments one, two and five. The reward for the first value function for showing the video can be based on whether the user finishes the video before unlocking the phone combined with the outcome of the possible call to action.

The system records a video using a user-facing camera that captures the user's face during the time between the screen on and keyguard unlock events. A sampled set of one or more video frames are used as an input to a neural network that estimates the value of showing the user a call to action screen after unlocking. These images capture the user's response to the video. Then, when the keyguard is unlocked, based on the value function estimate, the system may show a longer video advertisement or a call to action screen associated with the first ad before displaying an app or the home screen or as a notification. The value function can also choose between multiple ways of showing a follow up ad or call to action, for example showing the call to action as a full screen overlay or as a notification. The decision is done using an epsilon-greedy approach with the value of the epsilon decreasing with increased data samples from 0.5 to 0.1. The approach chooses the best action according to the value function with a probability of 1-epsilon and a random action with a probability of epsilon.

The system records the response of the user responds to the call to action or longer video ad. The response together with the video frames recorded during the video preceding the action are bundled into a training data point. This training data point and previous training data points for "wait" actions leading to the "show" action form a sequence of data points. The recorded sequences are uploaded to a server at a suitable moment, when the device has high bandwidth or low cost network connectivity, and is charging or has a high battery level.

The server trains the neural network model using the sequences of data points from users, so that each sequence consists of one or more events with wait decisions followed by an event with a show decision resulting in a user response. The server maps the user response to a reward. The neural network model is then trained with the uploaded frames from each data point as a single training sample using a discounted version of the eventual reward as the label of the training sample. For example, using a discount factor of 0.9 and a positive reward of 1, a training sample of a successful show action would get the full reward 1 as the label. A training sample of a wait action two steps away would get 0.9*0.9*1=0.81 as its label. Training of a neural network with images as inputs is a technique described in [Lecun, Mnih] and a skilled practitioner in the art can implement it.

Using sequences of events can lead to instability of the learning in the neural network. Random sampling of the training data batches as discussed in related work [Mnih] can help with this.

The devices fetch an updated value function model from the server periodically and start applying the new model. In this embodiment, the users share the same model, but the inputs are personalized, finding the best moments to show the video to each user.

Fifth Possible Embodiment

In a fifth possible embodiment, the value function is implemented using an ensemble model of decision trees. The learning of the model is performed on a server and the network is evaluated on the device. The value function is used for choosing the best moment for showing the video based on a set of inputs describing the receptivity of the user and a content score for the video.

The system tracks the opening of apps on the device, that is which apps are opened and when. This information is derived into features: number of games opened in last 20 minutes, number of productivity apps opened in last 20 minutes, number of communication apps opened in last 20 minutes, and last used app name and category. These features are used to provide an estimate of the user's boredom level, that is would they be annoyed at being shown content they did not request. Further, the system tracks the in app behavior of the user, such as number of keys pressed, to estimate if the user is more in an active mindset or passively consuming information. In addition to the pure contextual data, the system tracks the time from last watched ad to model the video load, and the score of the video chosen by the content selection system to model how likely the user is to open the video in general. These features are then used as inputs for the value function.

The model for the value function is evaluated on the device, when the user leaves an application. The devices upload sequences of training data, consisting of features and user responses to the server. The system is trained on a server using sequences of events as in the fourth embodiment, except the learning model used in this embodiment is a decision tree ensemble model. For example, Mondrian forests are a suitable ensemble model [Lakshminarayanan] for the purpose as they allow training sample-by-sample, instead of requiring full retraining of the model with new data. A practitioner skilled in the art can implement the training and evaluation of the value function.

As in the fourth embodiment, the user's computing device fetches an updated model regularly from the server and uploads the training samples to the server. These training samples may be mixed with random noise to improve the user's privacy.

In this embodiment, the users share the same model, but the inputs are personalized, allowing the shared model to find the best moments to show the video to each user.

Figure 9:
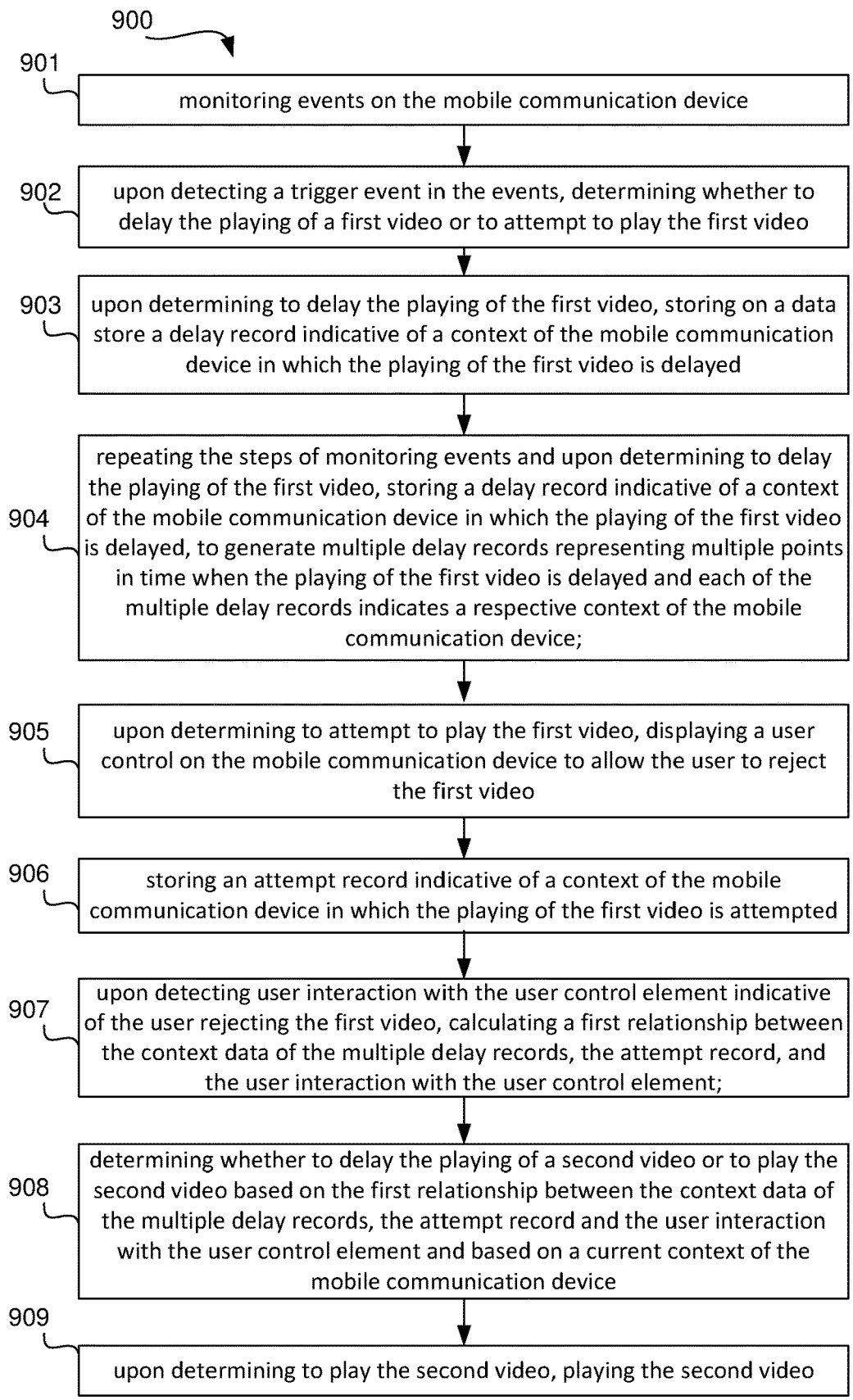
FIG. 9 illustrates a method for selectively playing a video on a mobile communication device.
Figure 10:
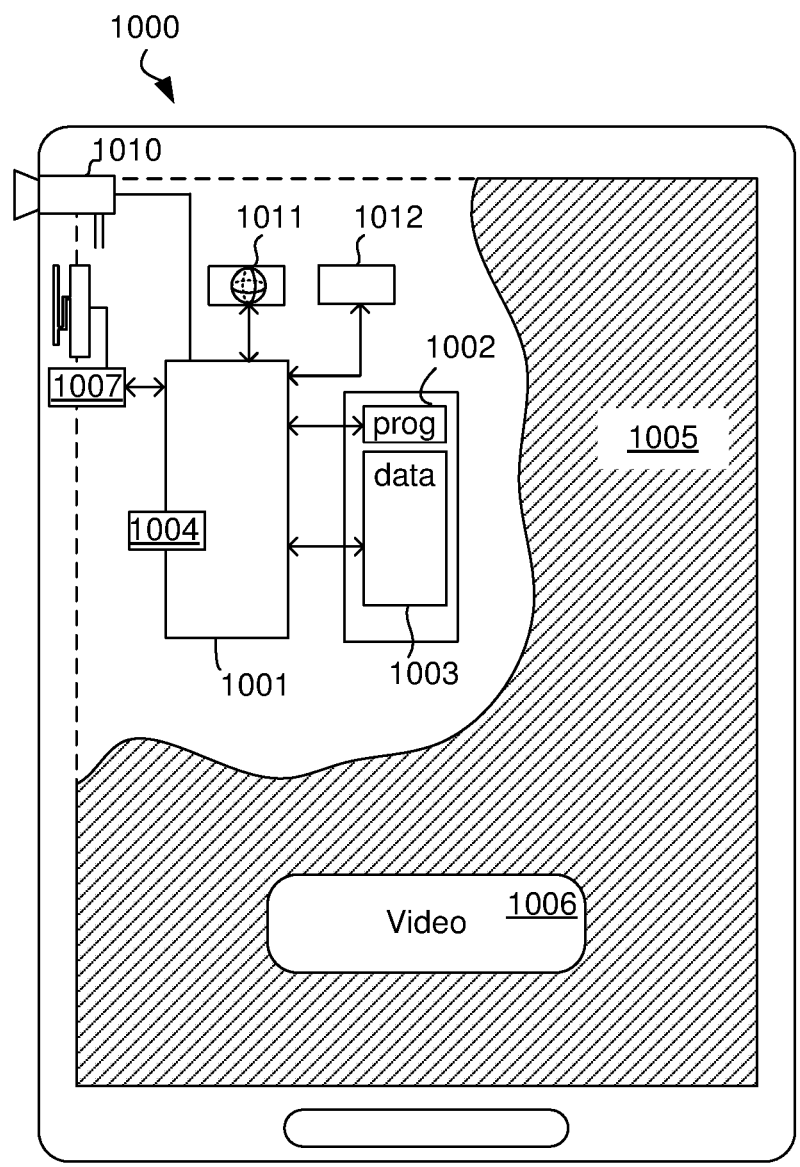
FIG. 10 illustrates a mobile communication device that selectively plays videos.

FIG. 9 illustrates a method 900 for selectively playing a video on a mobile communication device in accordance with the detailed description above. FIG. 10 illustrates a communication device 1000 comprising a processor 1001 connected to program memory 1002 and data memory 1003. Program code stored on the data memory 1003 causes processor 1001 to perform method 900 in FIG. 9. Processor 1001 is further connected to display interface 1004 that communicates with display 1005 to show a video 1006. Processor 1001 is also connected to an antenna module 1007 to receive videos over a wireless network, such as a cellular network including 3G, 4G, LTE, etc. or WiFi or other networks. Communication device 1000 also comprises a camera 101 to capture images or videos of the user's face, a GPS module 1011 and inertial sensor module 1012 which can all generate context data.

When in use, processor 1001 monitors 901 events on the mobile communication device and upon 902 detecting a trigger event in the events, determines whether to delay the playing of a first video or to attempt to play the first video. Upon 903 determining to delay the playing of the first video, processor 1001 stores on a data store a delay record indicative of a context of the mobile communication device (such as captured by sensors 1011, 1012) in which the playing of the first video is delayed. Processor 1001 repeats 904 the steps 901, 902 and 903 of monitoring events and upon determining to delay the playing of the first video, storing a delay record indicative of a context of the mobile communication device in which the playing of the first video is delayed, to generate multiple delay records representing multiple points in time when the playing of the first video is delayed and each of the multiple delay records indicates a respective context of the mobile communication device. In a sense, the multiple records constitute learning samples with feature values but without label values.

Further, upon 905 determining to attempt to play the first video, processor 1001 displays a user control on the mobile communication device, such as a skip button, to allow the user to reject the first video, such as by skipping the video. Processor 1001 also stores 906 an attempt record indicative of a context of the mobile communication device in which the playing of the first video is attempted.

Upon 907 detecting user interaction with the user control element indicative of the user rejecting the first video, calculating a first relationship between the context data of the multiple delay records, the attempt record, and the user interaction with the user control element. In a sense, the user interaction creates the label values for the stored learning samples and calculating the relationship performs machine learning using the learning samples that now include feature values as well as label values. The details of calculating this relationship are provided above in relation to the value functions and other machine learning methods that are disclosed herein.

Processor 1001 then determines 1008 whether to delay the playing of a second video or to play the second video based on the first relationship between the context data of the multiple delay records, the attempt record and the user interaction with the user control element and based on a current context of the mobile communication device. Finally, upon determining to play the second video, processor 1001 plays the second video.

Although communications port 1007 and display port 1004 are shown as distinct entities, it is to be understood that any kind of data port may be used to receive data, such as a network connection, a memory interface, a pin of the chip package of processor 1001, or logical ports, such as IP sockets or parameters of functions stored on program memory 1002 and executed by processor 1001. These parameters may be stored on data memory 1003 and may be handled by-value or by-reference, that is, as a pointer, in the source code.

The processor 1001 may receive data through all these interfaces, which includes memory access of volatile memory, such as cache or RAM, or non-volatile memory, such as an optical disk drive, hard disk drive, storage server or cloud storage. Processor 1001 may further be part of a cloud computing environment, such as a managed group of interconnected servers hosting a dynamic number of virtual machines.

It is to be understood that any receiving step may be preceded by the processor 1001 determining or computing the data that is later received. For example, the processor 1001 determines a context and stores the context in data memory 1003, such as RAM or a processor register. The processor 1001 then requests the data from the data memory 1003, such as by providing a read signal together with a memory address. The data memory 1003 provides the data as a voltage signal on a physical bit line and the processor 1001 receives the context via a memory interface.

It is to be understood that throughout this disclosure unless stated otherwise, nodes, edges, graphs, solutions, variables, events, context, relationships and the like refer to data structures, which are physically stored on data memory 1003 or processed by processor 1001. Further, for the sake of brevity when reference is made to particular variable names, such as "context" or "relationship" this is to be understood to refer to values of variables stored as physical data in computer system 1001.

Further, FIG. 9 is to be understood as a blueprint for the software program and may be implemented step-by-step, such that each step in FIG. 9 is represented by a function in a programming language, such as C++ or Java. The resulting source code is then compiled and stored as computer executable instructions on program memory 1002.

Further Examples

Videos may be shown inside an application. Further, user's past use of the application, history of viewed application content may be part of the context. Some examples of application context include products viewed, time spent within each screen or activity, what videos or images did the user view, did the user go back to a product in the application. The advantage is that users may respond to certain videos better in some application contexts which will be reflected in the value functions, that is, the relationship between the user interaction and the context in past records.

The system (model), that is the relationship, can be trained on multiple users or a single user. If a separate copy of the system exists for each user, they may share the starting point configuration trained on a set of users behavioural data. This configuration can be expressed as a set of distributions for different system parameters. The distribution of each parameter is from a set of one or more systems trained over the existing users behavioural data. For example in the case of Bayesian linear regression, a single model may be trained over all the users data with the model parameters having a probability distribution.

As a second example, if the system runs on mobile devices, to protect the user's privacy and avoid collecting behavioural data, the parameters of the individual systems may be collected and combined into distributions on the server. Each new user's system model may then use the distributions as the starting values for their own system. This way new users starting configuration will emphasize parameters for which the values were uniform for the other users with a peaky and narrow distribution, while de-emphasizing starting values for parameters which varied between the users through a flatter and wider distribution.

Instead of switching between exploring new options and exploiting the acquired learning as discussed above, these two modes can be combined. When deciding whether to show a video at a time, the decision can be probabilistic, and the confidence in the expected rewards can be used to choose between actions in additions to the expected values of reward for each action. For example, the system may always choose the action with the highest upper bound of confidence. The confidence can be derived from the distributions of the parameters using Bayesian methods.

Instead of explicit confidence values, the expected rewards for each action may be drawn from a probabilistic learning process, which narrows down the distribution of values with increased learning, and the action with the highest reward is always chosen. In one example, the system applies Thompson sampling for this purpose.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The following references are included herein by reference:

[Baird] Baird, Leemon. "Residual algorithms: Reinforcement learning with function approximation." Proceedings of the twelfth international conference on machine learning. 1995.

[Zhang] Zhang, Tong. "Solving large scale linear prediction problems using stochastic gradient descent algorithms." Proceedings of the twenty-first international conference on Machine learning. ACM. 2004.

[Singh] Singh, Satinder P., and Richard S. Sutton. "Reinforcement learning with replacing eligibility traces." Machine learning 22.1-3 (1996): 123-158. 1996

[LeCun] LeCun, Y., Bottou, L., Bengio, Y., and Haffner, P. Gradient-based learning applied to document recognition. Proceedings of the IEEE, 86(11), 2278-2324. 1998

[Mnih] Mnih, Volodymyr, et al. "Human-level control through deep reinforcement learning." Nature 518.7540 (2015): 529-533. 2015

[Lakshminarayanan] Lakshminarayanan, Balaji, Daniel M. Roy, and Yee Whye Teh. "Mondrian forests: Efficient online random forests." Advances in neural information processing systems. 2014

The invention claimed is:

1. A method for selectively playing a video on a mobile communication device, the method comprising:
   monitoring events on the mobile communication device;
   upon detecting a trigger event in the events, determining whether to delay the playing of a first video or to attempt to play the first video;
   upon determining to delay the playing of the first video, storing on a data store a delay record indicative of a context of the mobile communication device in which the playing of the first video is delayed;
   repeating the steps of monitoring events and upon determining to delay the playing of the first video, storing a delay record indicative of a context of the mobile communication device in which the playing of the first video is delayed, to generate multiple delay records representing multiple points in time when the playing of the first video is delayed and each of the multiple delay records indicates a respective context of the mobile communication device;
   upon determining to attempt to play the first video, displaying a user control on the mobile communication device to allow the user to reject the first video;

storing an attempt record indicative of a context of the mobile communication device in which the playing of the first video is attempted;

upon detecting user interaction with the user control element indicative of the user rejecting the first video, calculating a first relationship between the context data of the multiple delay records, the attempt record, and the user interaction with the user control element;

determining whether to delay the playing of a second video or to play the second video based on the first relationship between the context data of the multiple delay records, the attempt record and the user interaction with the user control element and based on a current context of the mobile communication device; and upon determining to play the second video, playing the second video.

2. The method of claim 1, wherein monitoring events comprises monitoring events generated by a user interacting with the mobile communication device.

3. The method of claim 1, wherein the video comprises an advertisement video.

4. The method of claim 1, wherein the context is independent from the video and includes one or more of time of day, user activity, active apps and sensor data.

5. The method of claim 1, wherein calculating a relationship comprises calculating one or more of a positive weight upon the video being played, a negative weight upon the video being rejected and a negative weight upon the video being delayed.

6. The method of claim 1, wherein calculating the relationship comprises calculating a value function that maps feature values to expected benefits of delaying and/or attempting to play the video.

7. The method of claim 6, wherein the value function is based on a time elapsed since last played video.

8. The method of claim 6, wherein calculating the relationship comprises calculating a first value function and a second value functions, the first value function is in relation to attempting to play the video and the second value function is in relation to delaying the video.

9. The method of claim 6, wherein the value function is linear.

10. The method of claim 6, wherein the value function is based on parameters reflecting the relationship.

11. The method of claim 1, wherein calculating the relationship comprises reinforcement learning and/or linear regression.

12. The method claim 1, wherein calculating the relationship and determining whether to delay the playing of the second video is based on an ensemble model of decision trees or on a neural network or both.

13. The method of claim 1, wherein determining whether to delay the playing of the second video is based on a predetermined number of times a video is to be played.

14. The method of claim 1, further comprising allocating an incentive to the user upon playing the video.

15. The method of claim 14, further comprising recording a video of the user and determining allocating the incentive based on a facial expression detected in the video.

16. The method of claim 1, wherein calculating the relationship comprises sending training data to a server and retrieving relationship parameters from the server.

17. The method of claim 1, further comprising selecting the second video from multiple candidate videos.

18. The method of claim 17, wherein selecting the second video is based on meta-data of the second video and a second relationship between meta-data of the first video and the user interaction with the user control element.

19. A mobile communication device for selectively playing a video on a mobile communication device, the mobile communication device comprising:

a user interface to allow user interaction to generate events;

a network connector to receive videos over a wireless data network;

a non-volatile memory to store videos and to store program code; and a processor configured by the program code to:
monitor the events on the mobile communication device;

upon detecting a trigger event in the events, determine whether to delay the playing of a first video or to attempt to play the first video;

upon determining to delay the playing of the first video, store on a data store a delay record indicative of a context of the mobile communication device in which the playing of the first video is delayed;

repeat the steps of monitoring events and upon determining to delay the playing of the first video, storing a delay record indicative of a context of the mobile communication device in which the playing of the first video is delayed, to generate multiple delay records representing multiple points in time when the playing of the first video is delayed and each of the multiple delay records indicates a respective context of the mobile communication device;

upon determining to attempt to play the first video, display a user control on the mobile communication device to allow the user to reject the first video;

store an attempt record indicative of a context of the mobile communication device in which the playing of the first video is attempted;

upon detecting user interaction with the user control element indicative of the user rejecting the first video, calculate a first relationship between the context data of the multiple delay records, the attempt record, and the user interaction with the user control element;

determine whether to delay the playing of a second video or to play the second video based on the first relationship between the context data of the multiple delay records, the attempt record and the user interaction with the user control element and based on a current context of the mobile communication device; and upon determining to play the second video, play the second video on the user interface.

* * * * *